Jan. 20, 1959 — C. M. COOPER — 2,870,258
AUTOMATIC METER READING SYSTEM
Filed Dec. 5, 1956 — 6 Sheets-Sheet 1
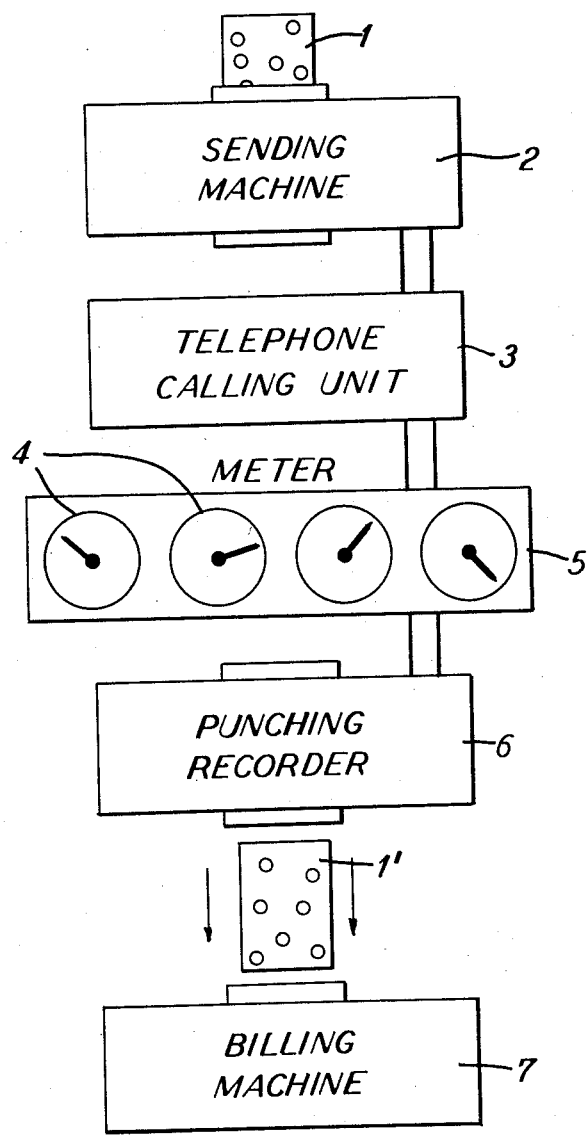
INVENTOR.
CURTIS M. COOPER

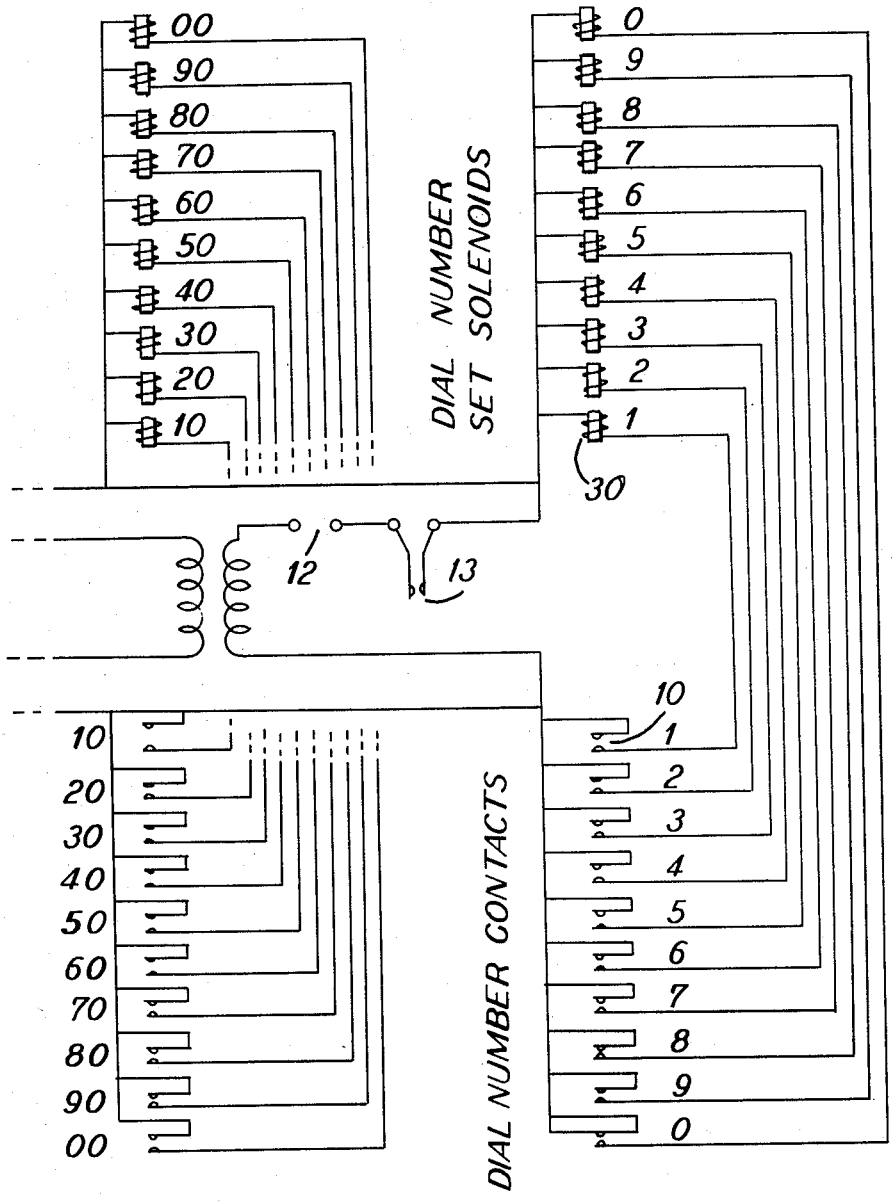

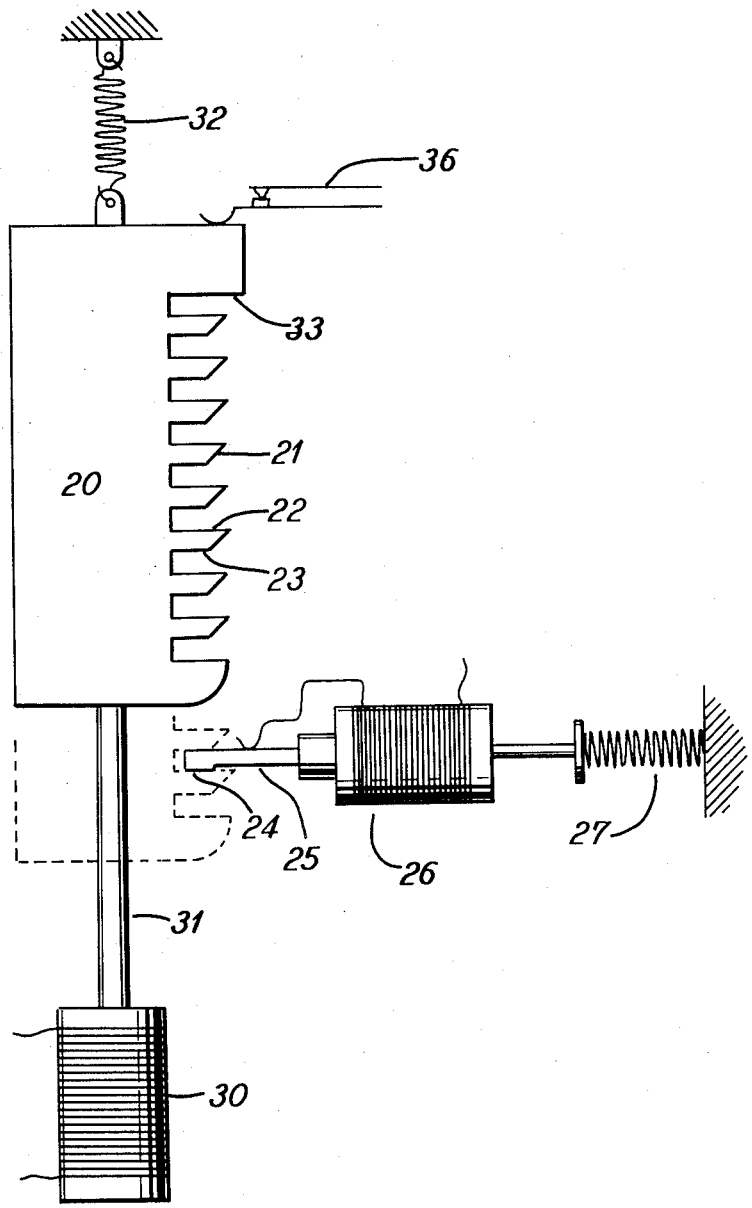

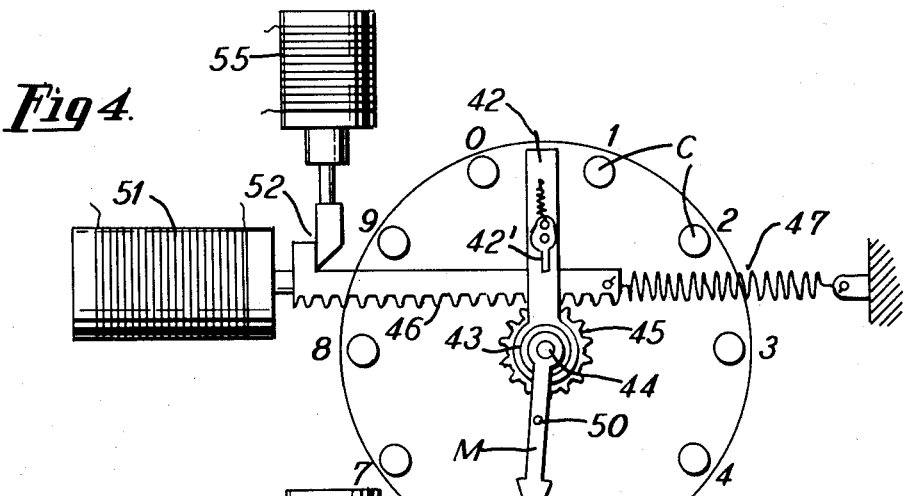
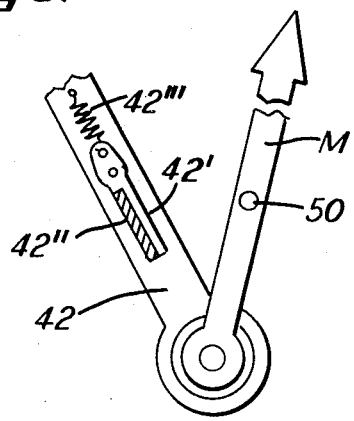

Jan. 20, 1959

C. M. COOPER 2,870,258

AUTOMATIC METER READING SYSTEM

Filed Dec. 5, 1956

INVENTOR.
CURTIS M. COOPER

Jan. 20, 1959

C. M. COOPER 2,870,258

AUTOMATIC METER READING SYSTEM

Filed Dec. 5, 1956

INVENTOR.
CURTIS M. COOPER
BY Robert V. Moore, Atty.

United States Patent Office 2,870,258
Patented Jan. 20, 1959

2,870,258

AUTOMATIC METER READING SYSTEM

Curtis M. Cooper, Binghamton, N. Y.

Application December 5, 1956, Serial No. 626,438

3 Claims. (Cl. 179—2)

This invention relates to the reading of meters for public utility companies, and its purpose is to save the expense and trouble of using employees to do the reading and computing. To periodically enter all the places in a city and read customers' meters is a heavy expense to a utility company and an inconvenience to the customers who must leave their doors unlocked; and the readings written down by the meter man have to be copied and worked over by accountants in the central office before the bill can be computed and sent to the customer. While automatic punch card machines can now be made to do the computing and billing, the initial data has not been in a form that could go directly to accounting machines, so that the reading of meters and billing of customers has remained a long and expensive undertaking.

Under the present invention the meters can be read in any house that has a telephone line without entering the premises; and the data is immediately delivered to automatic computing and billing machinery of the punch card type so that the overall expense for trained personnel is greatly reduced and the public is given better service. Various attempts to accomplish this have been made in the past, but they either involved manual calling or some form of receiving other than going directly to the punch card machine, so that they did not attain the overall result desired.

Referring now to the drawings forming part of this specification,

Fig. 1 is a general view showing the combination of principal elements involved in the invention.

Fig. 2 is a diagrammatic view of the initial portions of the sending machine into which previously prepared punch cards can be automatically fed to prepare the telephone circuits to take the meter calls.

Fig. 3 is a view of the storage part of the telephone calling unit of the sending machine in which the customer's telephone dial number can be set up from the punch card and temporarily retained long enough to permit the meter data to be received. The solid lines show it in the passive or uncocked position. The broken lines show the relative position of the storage elements used in the transmitting operation, releasing dialing impulses for a certain digit of the telephone number to be called.

Fig. 4 is a diagrammatic view of the wiper mechanism mounted on each customer's meter at the other end of the telephone line, by which an electrical contact is moved over each digit of the meter dial to be read, creating successive short electrical impulses according to the meter reading, which impulses are transmitted back thru the telephone line to be recorded at a punch card receiving machine.

Fig. 5 is a detail view of the wiper arm contact.

Figure 6:
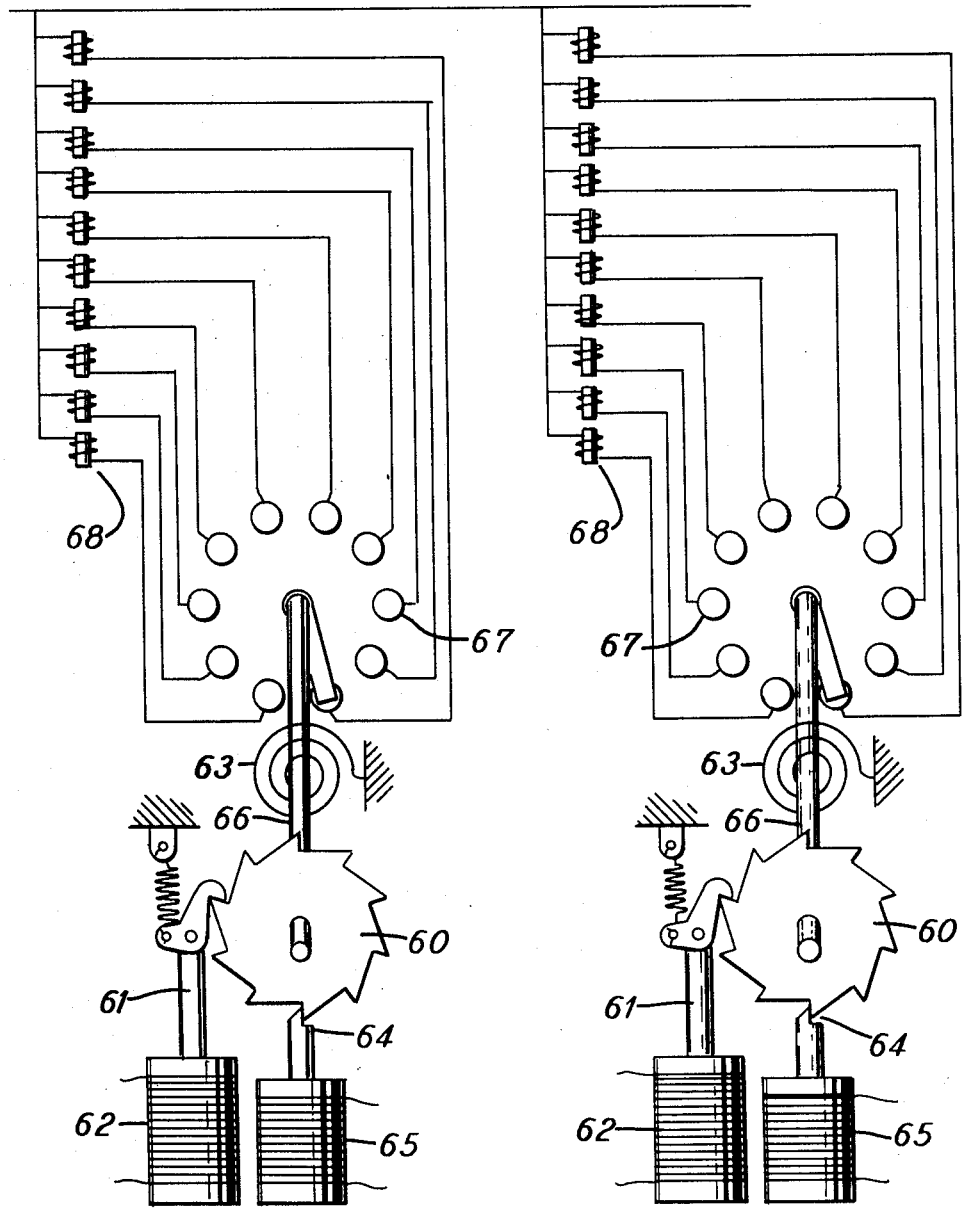

Fig. 6 is a diagrammatic view of the punch card receiving machine at which the incoming data is temporarily stored until the reading is completed, and then released to punch a customer's card accordingly, after which the entire mechanism is automatically reset to repeat the operation on the next customer's card. The cards thus punched with the meter data can be fed into the usual type of punch card billing machines.

Figure 7:
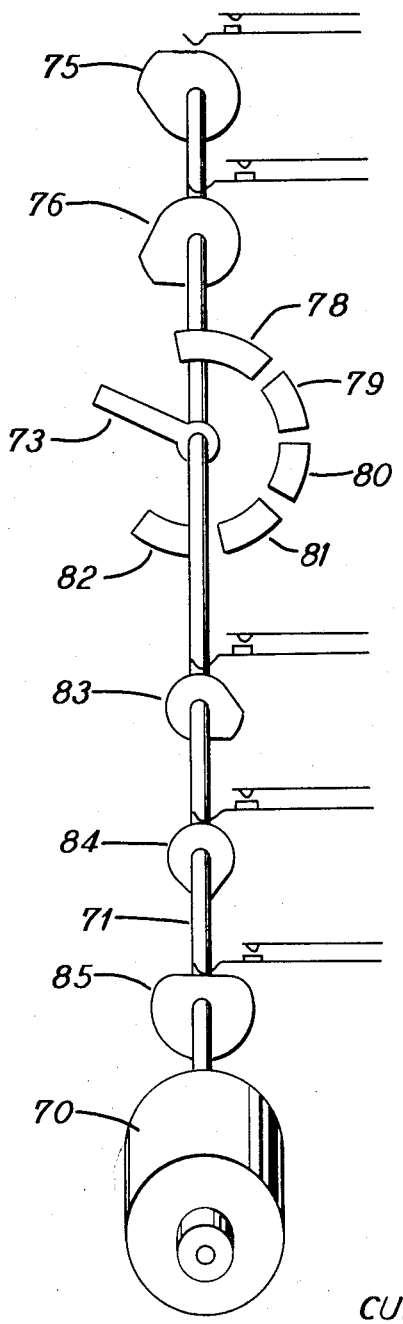

Fig. 7 is a general diagram of the time control mechanism.

Similar reference numerals refer to similar parts thruout the various views.

In view of the intricacy of dial telephone circuits and electrically operated punch card machines, no attempt is made here to illustrate complete circuits in such systems as it would unnecessarily burden this specification with their circuit complexity and obscure rather than disclose the present improvement. Such circuits are well known in the telephone and punch card machine arts, and in order to clearly point out the features of the present invention this specification is limited to the particular combinations by which the present improved result is obtained, as will be understood and utilized by those skilled in the prior art.

Referring now to Fig. 1 where the general combination is illustrated, the system is operated by punch cards 1, each of which has been previously prepared by punching according to a particular customer's name, address and telephone number. These cards are fed into the sending machine 2 which allows contacts thru the punch holes to energize the circuits of a telephone call transmitting unit 3, which if the line is clear proceeds to energize the reading elements 4 on the customer's meter 5 at the other end of the telephone line. These elements 4 send back successive short electrical impulses to punching recorders 6 of the step-by-step type which accumulate the data and then punch the meter reading on a customer's billing card 1' after which the foregoing mechanism is cleared for the next customer.

One of the features of the invention is that no persons are involved in the operation; and the principal data is carried by a series of uniform short impulses as distinguished from the former use of different resistances, or frequencies, or prolongation of contact.

The cards 1' that have been punched with the meter readings are then passed to regular punch card operated billing machines 7, so that the entire process is substantially automatic.

In Fig. 2 by way of illustration the closing circuits controlled by the holes in the calling punch card are shown at the bottom for the digits 1 to 0 in the right hand column, 10 to 00 in the next column, and similarly would be 100 to 000 in the next column and so on for as many numbers or letters used by the telephone exchange. Each switch contact 10 controls a certain corresponding solenoid 30 shown above in the drawing, for example, the contact for the dial number 1 can close the solenoid switch for dial number 1. For clarity in the drawing of Fig. 2, the circuits are only shown for the digits 1 to 0 and 10 to 00, the other circuits for higher numbers being similar as will be apparent.

Referring further to Fig. 2, the punch card operated sending machine of Fig. 1, indicated generally by the reference numeral 2, has contacts 10 which pass the currents thru particular circuits where holes have been punched in the card 1 of Fig. 1, while blocking all other circuits whose terminals are at other unpunched parts of the card. In order to insure that the card is fully inserted before any of the contacts 10 are energized, a microswitch 12 supplemented by a one-second thermo-switch 13 is provided, which controls the circuits of all the contacts 10 and is only closed when the punch card 1 is correctly in place, the controlling switch 12 generally being operated by the edge of the card or a particular hole or notch.

Each of the dial number contacts made thru the holes punched in the card energizes a separate solenoid 30 for each particular digit of every possible telephone number, each of which solenoids cocks a dialing number element such as a multiple contact wheel, a ratchet, or other step-by-step mechanism, so that when that dialing element is later released it will send out a number of electrical impulses corresponding to that particular digit. The term dialing is here used in the general sense of mechanical calling, though the actual motion need not be on a dial.

For example, if the first digit is 5, then the circuit thru that punch card hole corresponding to five will operate a solenoid 30 cocking a step-by-step element having five contacts, which when released will send step-by-step five electrical impulses to the telephone line, in effect the same as dialing a number 5 on an ordinary telephone. Where there are say six number digits and letters involved in the listed numbers of a telephone exchange for example, this requires some sixty individual solenoid operated number elements, each one only capable of sending out its particular number of successive electrical impulses. When a complete telephone calling number has been accumulated in six of such storage elements, each held in a cocked position, they can then be released in proper order to signal the central switchboard of the telephone company so as to make the connection to that customer's line.

Taking up this storage and dialing process more in detail, reference is made to Fig. 3 which shows a storage unit in its rest position in solid lines, and in broken lines shows it after cocking in the process of sending a series of electrical impulses to a telephone line corresponding to a particular digit or letter of a dialed number. Each such digit number storage unit comprises a suitably insulated plunger plate 20 having a series of electrical contact teeth 21 corresponding to whatever is the number of the digit to be dialed. In Fig. 3 one is shown with nine teeth, so that when operated it will give out nine impulses to activate a number nine at the telephone central exchange. For a digit number five such a storage unit would have five teeth or contact elements, for the digit 0 ten teeth, and so on, so that there are required a large number of such individual storage units, approximately fifty for a five number exchange, seventy for a seven number exchange, etc., as will be evident.

Each of the nine contacts shown by way of example in Fig. 3 has a conducting face 22 on its upper side and an insulating tooth 23 supporting the conductor 22, this insulating tooth 23 being beveled or tapered as shown so as to facilitate the entry of the stepping contact 24 at the end of the plunger 25 operated by the dial number release solenoid 26. The plunger 25 is forced into the teeth by an expansion spring 27 and is withdrawn by the operation of the release solenoid 26. A setting or cocking solenoid 30, when electrically energized, pulls down the plunger plate 20 by means of the rod 31 against the tension of the feeding or dialing spring 32 until the contact plunger 24—25 strikes the stop 33 at the upper end of the series of teeth. The plunger 25 is then forced by its spring 27 into the upper notch of the toothed series and thus holds the number storage element cocked until needed. The same is done in other units for as many as there are digits in the calling numbers of the exchange, these storage units being similar except for the number of teeth or contacts involved.

If the customer's number being called was for example 43527, the punch card controlling the storage circuits would activate unit four of the first digit series, unit three of the next, five of the next, two of the next and unit seven of the final digit series. Since each is an individual circuit, the punch card can activate them all simultaneously so that the complete number can be set up in the storage apparatus almost instantaneously by the cocking solenoids 30. These circuits are then opened automatically by a one second thermo switch 13, as shown in Fig. 2.

To operate thru the central telephone exchange it is only necessary to release the storage units in the same order that one would use in dialing, this successive operation being insured by the upper end switch 36 which closes when the rod 31 reaches the end of its return travel after each of the contacts 21 has sent out a dialing impulse. This terminal closing of the end switch 36 passes the action on to the next storage unit, and so on down in order. By this means the dialing numbers set up by a punch card are transmitted in a few seconds thru the exchange to the particular customer's telephone line. This connection is then held for a brief period sufficient to transmit back to the receiving punch card machine 6 the meter reading of that customer obtained by apparatus mounted on the meter as will now be described.

Referring now to Fig. 4, which shows the operating elements at the customer's location after the circuit to his place has been set up as described, the apparatus includes elements associated with the various meter shafts to pick up electrical impulses according to the meter reading and transmit them back to the company's accounting office. Because of the limited space available on a sheet of the drawing, only two of the meter dials 41 and the associated wiper or pick-up mechanisms are shown, but the principle is the same on all the dials.

These pick-up devices are substantially similar for each of the meter's dials 41, being energized successively in proper order as will be described. Taking up by way of example either of the meter dials of Fig. 4 having the usual reading numbers one to ten (0) inclusive, at each of these numbers is an electrical contact point C with which electrical contact can be made by a wiper arm 42. As the wiper arm 42 passes over these contact points C it sends electrical impulses to the receiving machine at the company's accounting office according to the number of points C contacted. The sweep of the arm 42 over the points C is effectuated in the following manner.

The arm 42 is mounted on a shaft 43 which is concentric with or an extension of the meter shaft 44 so that while independent in action they turn on the same center line. This shaft 43 can be rotated by the pinion 45 driven by a rack 46 pulled by a spring 47 for clockwise rotation, so as to move the wiper arm 42 successively over the numbered contact points C until the stopping contact 42' on the arm 42 meets the meter hand M. This sends a number of electrical impulses corresponding to the meter hand reading which go back to the machines in the accounting office.

When the wiper arm 42 reaches the meter hand M it connects with a stopping contact 50 thereon, which thereupon closes a circuit energizing the cocking solenoid 51 to pull the rack 46 in the opposite direction against the tension of the spring 47 and thus rotate the arm 42 back in a counter-clockwise direction to its original cocked position, where it remains until another call for a meter reading is made. In so returning the wiper arm 42 it again travels over the same contacts C in the opposite direction; but in order not to have such electrical impulses neutralize or confuse the reading impulses just previously transmitted, these secondary impulses are shorted out by the receiving mechanism at the accounting station, which only uses the first series of impulses, whatever number corresponds to the number of the meter dial reading.

When the cocking solenoid 51 pulls the rack 46 to the left, the trip 52 of the release solenoid 55 engages the rack 46 and holds it in the cocked position, which is also the resting position for the wiper arm 42. The resting position for the wiper arm is not quite the same as the zero position, as otherwise it would continuously close or short thru the zero meter contact point. When the wiper arm returns to the resting position, at the same time a contact is made which activates the release solenoid of the next meter dial unit so that it proceeds similarly to send its meter dial reading over the telephone line to the accounting station, and so on for as many dials as there are on the meter. This takes but a short time, after which the apparatus at the meter is cut off by the ten second time cam 85 shown in Fig. 7, and the receiving apparatus at the accounting office can then turn to another customer's meter.

Of course before dialing a number it is first necessary to see if the line is available. To do that a connection is first made that is sensitive to the dial tone to make sure that the line is live. If so the dial tone is present, and the connection is automatically made for the number in storage as described maintained to allow the meter reading to come thru. If a busy signal is found, a kick-out switch tosses out that particular punch card and restores all the numerals in storage to their initial position so as to be ready to accept the numbers from the next card. It is generally preferable to operate this meter reading mechanism in the quiet hours preferably after midnight when very few lines are busy; and as the bell does not ring, and few telephones are in use, the customer is not likely to be disturbed.

If the gear train in the meter is so arranged that the hands rotate in alternate directions, the alternate pinions 45 can be placed on the other side of the racks 46 so as to reverse the direction of rotation accordingly.

The contact face of the wiper arm 42 where it rubs the contacts C in its sweep of rotation is made somewhat springy or yielding so as to have enough give to take up wear and to insure that it does not stick on any contact C, thus insuring smooth and reliable performance.

Referring now to Fig. 4 and Fig. 5, the meter hand M at each dial always turns in a constant direction, and its motion must not be blocked or stopped by the contact 42' on the wiper arm 42 or any other part of the reading mechanism. In order to protect against any such strain or stoppage provision is made for the rotating meter hands M to over-ride or pass by the contact 42' on the wiper arm 42 without damaging either element. As shown in detail in Fig. 5, the contact 42' on the wiper arm 42 is provided with an insulating back plate 42" secured thereto, and these elements are yieldably mounted by means of a spring 42''' so that as the contact 50 on the meter hand M in its normal progress approaches the contact 42' on the wiper arm 42, it first meets the insulated back 42" which folds down out of the way due to the yielding of the spring 42''' and thus allows the meter hand M to progress without activating or damaging the contacts 50—42'.

On the other hand, when the contact 42' on the wiper arm 42 is seeking the meter hand M, it overtakes it from the rear, and the instant the contact 50—42' is made, the cocking solenoid 51 pulls the rack 46 to the left and thus rotates the contact 42' on the wiper arm 42 back to its resting position, so that no undue strain is ever transmitted to the meter hand M.

The counting electrical impulses coming in from the meters to the central office station are used to set up corresponding numbers at the punching machines for the punch card records. Referring now to Fig. 6, for each dial at the meter there is a corresponding ten tooth counting wheel 60 at the punching recorder receiving machine 6, which wheel 60 turns one tooth for each metering electrical impulse sent to the central station by the meter reading apparatus described in connection with Fig. 4 and Fig. 5. This counting wheel 60, operated by a solenoid plunger 61 pulls the ratchet teeth of the wheel 60 one tooth whenever the solenoid 62 receives an electrical impulse from the contacts 42–C of Fig. 4 and Fig. 5. As previously described, these impulses are each short, uniform and definite, and do not depend on the use of different resistances, or frequencies, or prolongation of contact as found in prior devices. The wheel 60 turns against the spiral spring 63 and is held from retracting by the ratchet having a pawl or stop 64 controlled by the release solenoid 65. The counting wheel 60 is mounted on the same shaft 66 with a ten contact rotary switch 67 having individual circuits to ten card punching solenoids 68. Therefore, if for example, seven of the electrical impulses transmitted from the meter come thru to the solenoid 62 moving the wheel 60 seven teeth, the switch 67 will be rotated to a position connecting the circuit to a punching element 68 corresponding to the digit 7 of that part of the meter reading to be punched; and similarly for all other numbers at the various meter dials. These numbers are set up as fast as the electrical impulses come thru from the apparatus described in connection with Fig. 4.

When all the rotary switches 67 have been thus duly set according to the meter reading, the ninth second circuit of the series of seconds shown in the timing mechanism of Fig. 7 is closed, sending a flow of current thru the contact elements set in the switches 67 and thus to the specific card punch solenoids 68 to punch corresponding holes in the punch cards. These punched cards are subsequently used to compute and send out the customer's bill, by the use of card operated billing machines.

When a card has been duly punched as described, a cam at the 9½ second position of the timing mechanism shown in Fig. 7 energizes a kick-out mechanism to eject the card and clears the receiving and punching mechanism, dial number storage units, meter reading apparatus, and associated parts, so that all return to their normal resting position ready to receive another customer's card and start another reading.

All the timing elements are controlled either by thermo-switches for the briefer periods or motor driven time switches for the longer periods where a definite cycling control is desired. These are set up so that generally the entire cycle of operation may for example take ten seconds or less, with a 9¾ second holding cam finally cutting into position and stopping the main motor which drives the appropriate timing cams to control the overall operation. The main motor can usually be set for one revolution in ten seconds, after which everything goes back to its normal resting positions and ready for the next cycle of operation.

Such motor driven time switches by which various circuits are opened or closed at appropriate times are well known in the electrical art and need not be further described. Fig. 7 illustrates a typical layout of time control such as might be used to carry the principal mechanisms described in the foregoing thru their respective cycles in the desired order and timing. A drive motor 70 geared to produce one revolution or cycle in ten seconds turns a main shaft 71 or suitable supplementary shafts geared thereto so as to operate various cams cutting in and out appropriate switch elements of the meter reading and card punching mechanism in the succession of steps described, and also turning the rotary contact arm 73 over a series of electrical contact segments to make appropriate electrical connections for that purpose. For example, the cam 75 may control the first two seconds, the cam 76 control the third second, the wiper arm 73 rotate successively over the switch segments 78, 79, 80, 81 and 82, connecting for the 4th, 5th, 6th, 7th and 8th seconds respectively. Then the cam 83 may pick up the control at the 9th second, the cam 84 at the 9½ second, while at the 9¾ second the entire cycle of operation of the meter reading and punching mechanism is completed, whereupon the holding cam 85 takes over the cleared machine and holds it in readiness for the next actuation induced by inserting at the sending machine 2 another customer's punched card 1. These timing elements and controls are merely illustrative, as the periods will vary in different installations according to the size of the exchange and the complexity of the detailed operation involved.

While I have in the foregoing described certain specific forms by way of example, it will be understood that they are merely for the purpose of illustration to make clear the principles of the invention, which is not limited to the particular forms shown but is susceptible to various modifications and adaptations in different installa-

What is claimed is:

1. In an automatic meter reading system for reading customers meters of utility companies, the combination of a punch card operated sending machine having circuits adapted to be energized thru contacts at the punched holes in the card, storage units simultaneously operated by said circuits and held in cocked position for temporarily retaining the telephone number indicated by the card, a dial telephone system, successive switches for releasing the individual storage units in the proper order for dialing the customer's number, electrical pick-up contacts at the meters corresponding to the digits of the meter dials, reading hands on said dials, electrical wipers adapted to sweep over said pick-up contacts and send out a series of short uniform electrical impulses corresponding to the numbers indicated by the meter reading hands, a punch card receiving machine having step-by-step mechanisms for receiving and temporarily storing the meter reading indicated by said series of short electrical impulses, and a card punching mechanism operated by the simultaneous release of said receiving storage mechanism, whereby the customer's card is punched according to the reading indicated at the meter.

2. In an automatic meter reading system for reading customers meters of utility companies, the combination of a punch card operated sending machine having circuits adapted to be energized thru contacts at the punched holes in the card, storage units simultaneously operated by said circuits and held in cocked position for temporarily retaining the telephone number indicated by the card, each storage unit having a fixed number of successive contacts corresponding to the number of dialing impulses associated with the particular digit or symbol of a dialing number, a dial telephone system, successive switches for releasing the individual storage units in the proper order for dialing the customer's number, electrical pick-up contacts at the meters corresponding to the digits of the meter dials, reading hands on said dials, electrical wipers adapted to sweep over said pick-up contacts and send out a series of short uniform electrical impulses corresponding to the numbers indicated by the meter reading hands, a punch card receiving machine having step-by-step mechanisms for receiving and temporarily storing the meter reading indicated by said series of short electrical impulses, and a card punching mechanism operated by the simultaneous release of said receiving storage mechanism, whereby the customer's card is punched according to the reading indicated at the meter.

3. In an automatic meter reading system for reading customers meters of utility companies, the combination of a punch card operated sending machine having circuits adapted to be energized thru contacts at the punched holes in the card, storage units simultaneously operated by said circuits and held in cocked position for temporarily retaining the telephone number indicated by the card, each storage unit having a fixed number of successive contacts corresponding to the number of dialing impulses associated with the particular digit or symbol of a dialing number, a dial telephone system, successive switches for releasing the individual storage units in the proper order for dialing the customer's number, electrical pick-up contacts at the meters corresponding to the digits of the meter dials, reading hands on said dials, electrical wipers adapted to sweep over said pick-up contacts and send out a series of short electrical impulses corresponding to the numbers indicated by the meter reading hands, the sweep of the wipers being only to the reading hands' position while the meter hands progressing in their normal rotation from time to time pass by the wipers without energizing them, a punch card receiving machine having step-by-step mechanism for receiving and temporarily storing the meter reading indicated by said series of short electrical impulses, and a card punching mechanism operated by the simultaneous release of said receiving storage mechanism, whereby the customer's card is punched according to the reading indicated at the meter.

References Cited in the file of this patent

UNITED STATES PATENTS

| | | |
|---|---|---|
| 1,802,643 | Floyd | Apr. 28, 1931 |
| 1,902,465 | Pratt | Mar. 21, 1933 |
| 1,955,043 | Yates et al. | Apr. 17, 1934 |
| 2,007,669 | Yates | July 9, 1935 |